(12) United States Patent
Goldstein et al.

(10) Patent No.: US 11,331,828 B2
(45) Date of Patent: May 17, 2022

(54) PRE-POUR SLUMP MAXIMIZATION OF DELIVERED CONCRETE

(71) Applicant: VERIFI LLC, Cambridge, MA (US)

(72) Inventors: Gregory A. Goldstein, Somerville, MA (US); Mark F. Roberts, North Andover, MA (US); Nathan A. Tregger, Northborough, MA (US); Byong-wa Chun, Waban, MA (US); Kati Hazrati, Concord, MA (US)

(73) Assignee: VERIFI LLC, Cambridge, MA (US)

( * ) Notice: Subject to any disclaimer, the term of this patent is extended or adjusted under 35 U.S.C. 154(b) by 535 days.

(21) Appl. No.: 16/336,518

(22) PCT Filed: Sep. 25, 2017

(86) PCT No.: PCT/US2017/053166
§ 371 (c)(1),
(2) Date: Mar. 26, 2019

(87) PCT Pub. No.: WO2018/058012
PCT Pub. Date: Mar. 29, 2018

(65) Prior Publication Data
US 2021/0291403 A1    Sep. 23, 2021

Related U.S. Application Data

(60) Provisional application No. 62/399,636, filed on Sep. 26, 2016.

(51) Int. Cl.
*B28C 5/42* (2006.01)
*B28C 7/02* (2006.01)
*B28C 7/04* (2006.01)

(52) U.S. Cl.
CPC ............. *B28C 5/422* (2013.01); *B28C 7/026* (2013.01); *B28C 7/0418* (2013.01)

(58) Field of Classification Search
CPC ....... B28C 5/422; B28C 7/026; B28C 7/0418; B28C 7/024; C04B 40/0032
See application file for complete search history.

(56) References Cited

U.S. PATENT DOCUMENTS 4,318,177 A    3/1982  Rapp
4,356,723 A   11/1982  Fay
(Continued)

FOREIGN PATENT DOCUMENTS

EP    0126573        11/1984
WO    WO2007060272    5/2007
WO    WO2015160610   10/2015

OTHER PUBLICATIONS

Young, Form PCT/ISA/210 International Search Report for International Apn No. PCT/US/17/53166, dated Dec. 4, 2017, 2 Pages.
(Continued)

*Primary Examiner* — Charles Cooley
(74) *Attorney, Agent, or Firm* — Craig K. Leon

(57) ABSTRACT

A method and system for initiating a majority percentage of chemical admixture dosage into a delivered concrete load preferably just before arrival of the concrete delivery truck at the delivery pour site, such that a maximized slump (or slump flow, or other slump characteristic) increase occurs just before discharge/pour. The invention employs a concrete slump management system having a processor that is programed to consider time of pour (discharge) and stored data that includes dosage response (change of slump characteristic) of the concrete mix due to past additions in the same type of concrete mix, and thus maximizes pre-pour increase in slump characteristic while minimizing or avoiding the risk of overshooting the slump target as well as limiting the time required for adjusting concrete to attain the target slump value at the jobsite.

14 Claims, 9 Drawing Sheets

(56) References Cited

U.S. PATENT DOCUMENTS

| | | | |
|---|---|---|---|
| 5,713,663 A * | 2/1998 | Zandberg | B28C 7/0454 |
| | | | 366/8 |
| 5,752,768 A | 5/1998 | Assh | |
| 6,042,258 A | 3/2000 | Hines et al. | |
| 6,042,259 A * | 3/2000 | Hines | B28C 7/024 |
| | | | 366/17 |
| 6,484,079 B2 | 11/2002 | Buckelew et al. | |
| 8,020,431 B2 * | 9/2011 | Cooley | B28C 5/422 |
| | | | 73/54.03 |
| 8,118,473 B2 * | 2/2012 | Compton | B28C 5/422 |
| | | | 366/17 |
| 8,311,678 B2 | 11/2012 | Koehler et al. | |
| 8,491,717 B2 | 7/2013 | Koehler et al. | |
| 8,727,604 B2 * | 5/2014 | Compton | B28C 7/12 |
| | | | 366/61 |
| 8,746,954 B2 * | 6/2014 | Cooley | B28C 5/4275 |
| | | | 366/54 |
| 8,764,272 B2 * | 7/2014 | Hazrati | G01N 33/383 |
| | | | 366/2 |
| 8,764,273 B2 | 7/2014 | Roberts et al. | |
| 8,818,561 B2 * | 8/2014 | Koehler | G01N 11/00 |
| | | | 700/265 |
| 8,960,990 B2 | 2/2015 | Koehler et al. | |
| 8,989,905 B2 | 3/2015 | Sostaric et al. | |
| 9,199,391 B2 | 12/2015 | Beaupre et al. | |
| 9,550,312 B2 * | 1/2017 | Roberts | G01N 33/383 |
| 9,789,628 B2 * | 10/2017 | Chun | B28C 7/12 |
| 9,952,246 B2 * | 4/2018 | Jordan | G01C 25/005 |
| 10,183,418 B2 * | 1/2019 | Jordan | G01N 33/383 |
| 10,329,202 B2 * | 6/2019 | Tregger | B28C 7/024 |
| 10,363,684 B2 * | 7/2019 | Roberts | G01N 11/00 |
| 10,647,026 B2 * | 5/2020 | Jordan | B28C 5/422 |
| 2007/0185636 A1 * | 8/2007 | Cooley | B28C 7/12 |
| | | | 701/50 |
| 2008/0316856 A1 * | 12/2008 | Cooley | B28C 5/4275 |
| | | | 366/142 |
| 2009/0037026 A1 * | 2/2009 | Sostaric | B01F 15/00207 |
| | | | 700/265 |
| 2009/0171595 A1 | 7/2009 | Benegas | |
| 2011/0029134 A1 * | 2/2011 | Hazrati | G01N 33/383 |
| | | | 700/265 |
| 2011/0077778 A1 * | 3/2011 | Berman | G05B 15/02 |
| | | | 700/265 |
| 2012/0016523 A1 * | 1/2012 | Koehler | G01N 11/00 |
| | | | 700/265 |
| 2014/0104066 A1 | 4/2014 | Jordan et al. | |
| 2014/0104972 A1 | 4/2014 | Roberts et al. | |
| 2014/0297204 A1 | 10/2014 | Biesak et al. | |
| 2015/0051737 A1 | 2/2015 | Berman | |
| 2015/0078417 A1 | 3/2015 | Verdino | |
| 2016/0355441 A1 * | 12/2016 | Tregger | B28C 7/024 |
| 2019/0256428 A1 * | 8/2019 | Tregger | C04B 40/0032 |
| 2021/0181079 A1 * | 6/2021 | Bollin | B28C 5/422 |
| 2021/0291403 A1 * | 9/2021 | Goldstein | B28C 5/422 |

OTHER PUBLICATIONS

Young, Form PCT/ISA/237 Written Opinion of the International Searching Authority For International Apn No. PCT/US/ 17/53166, dated Dec. 4, 2017, 5 Pages.

* cited by examiner

*(Upper Curve illustrating PRIOR ART approach
as compared to Lower Curve illustrating embodiment of Present Invention)*

(Exemplary Process of Present Invention)

(Exemplary Process of Present Invention)

PRE-POUR SLUMP MAXIMIZATION OF DELIVERED CONCRETE

FIELD OF THE INVENTION

The present invention relates to monitored concrete delivery, and more particularly a method and system for adding a maximized plasticizer admixture dosage into a delivered concrete mix load, the addition being preferably initiated before arrival of the concrete mix truck at the delivery pour site.

BACKGROUND OF THE INVENTION

Manufacturers of concrete for construction purposes have long sought the ability to dose liquid components, such as chemical admixtures, in an accurate and controlled manner to achieve a desired workability or target slump in the delivered concrete load at the time that the concrete is poured into place at the construction delivery site.

In U.S. Pat. No. 5,713,663 (1998), Zandberg et al. disclosed the use of monitoring torque used for rotating a concrete load in the mixing drum of a delivery truck and for dosing a correct amount of a liquid component into the concrete. It was further disclosed that if excess amounts of water were added into the truck, the concrete mix would fail the slump test and require the delivery truck to return to the depot so that extra particulate concrete ingredients could be added to correct the problem. Alternatively, the truck can wait until the slump decreases, which can take a significant amount of time. It was explained that if the extra particulate ingredients were not added within a relatively short time period after excessive liquid was added, then the concrete would not attain the required strength when cured. See US '663 at Column 1, lines 24-42. Moreover, there was strong economic incentive to avoid adding excess liquid because the customer could not be made to pay for the concrete returned to the depot. See US '663 at Column 1, lines 43-48. The anxiety caused by overdosing of liquids into concrete was further reflected in the cautious tone of Zandberg et al. when they described "adding [a liquid component] in *sufficient volume to approach a specified slump* of the mix to attempt to approach a predetermined minimum torque loading for the amount of the particulate material in the mixing barrel related to the specified slump . . . ". Bold italics added, US '663 at column 2, lines 16-20; See also column 3, at lines 55-60.

In other words, it was critical to add only a fraction of the theoretical amount of the total liquid component required to achieve a target slump and to repeat this operation in iterative fashion, to ensure that delivered concrete would approach but not exceed the target slump. To avoid wasted fuel, material, and driver/truck time, the concrete maker needed to avoid having to return a load to the mix plant or central depot.

This anxiety about overshooting a delivery slump target in the concrete load is not unique to the patent of Zandberg et al. This same anxiety was reflected fourteen years earlier in EP 1 126 573 of Durant (1984), who explained that "a predetermined workability" was to be achieved "by adding to the mixer with the solid constituents [of concrete] a predetermined fraction of the theoretical quantity of water." See Paragraph "57" (abstract on title page), lines 1-14, EP 1 126 573. Thus, by using a fraction of the theoretical quantity of a liquid component needed, one could avoid over-dosing the concrete and exceeding the target slump (i.e., desired workability) required at the delivery/pour site.

In U.S. Pat. Nos. 6,042,258 and 6,042,259, Hines et al. addressed the need for accurate monitoring of concrete in the mixer drum and taught that hydration stabilizers (e.g., set retarding agents) and/or activators (set accelerating agents) could be employed in a batch of new concrete or reclaimed concrete returned from the job site. They relied on charts to list factors that must be considered when dosing the concrete; and these factors included, for example, concrete material, mix design used, elapsed time from initial batching, plastic concrete temperature, and others. It was acknowledged by Hines et al. that charts could be misinterpreted or could contain exaggerated amounts or improper values. See e.g., U.S. Pat. No. 6,042,258 at Column 2, lines 31-54. Hines et al. believed that successful use of (chemical) admixtures depended upon the accuracy with which they were prepared and batched, and emphasized that " . . . batching means the weighing or volumetric measuring of the ingredients for a batch of either concrete or mortar and introducing them into the mixer." They further cautioned that the "amount of admixture added during batching must be carefully controlled." See U.S. Pat. No. 6,042,258 at Column 2, line 61-67.

In U.S. Pat. No. 8,311,678 (owned by the common assignee hereof), Koehler et al. disclosed that concrete rheology could be adjusted by using an adaptive process instead of consulting water and hydration levels, mix components, temperature, and other factors in lookup tables. This adaptive process allowed a target rheology value to be achieved through chemical or water additions without requiring inputs other than load size and target rheology (e.g., slump). In essence, Koehler et al. taught that the dosage of chemical or water required to change rheology of concrete loads is learned and implemented during each delivery of concrete, and, thus, could be learned independently of other factors. While information such as mix design or water contents are not known a priori, the initial doses authorized by the system processor are conservatively gauged to avoid exceeding a particular rheology (e.g., slump) target. Exceeding a slump target could result in significant lost time that would otherwise be needed for re-adjusting the slump of the concrete to meet a target value or waiting for the slump to decrease to the proper value. Koehler et al. reflected a cautious approach, therefore, for managing the rheology of the concrete while avoiding the necessity for having to input factors into a lookup table; and, accordingly, their approach involved numerous small adjustments before reaching the target slump so that the risk of exceeding it would be decreased.

The present inventors believe that a novel method and system are needed for accurate and expeditious dosing of liquid component (whether water and/or chemical admixtures), and, in particular, the dosing of chemical plasticizer admixtures, into the concrete load being delivered in a concrete mixer truck.

SUMMARY OF THE INVENTION

In surmounting the disadvantages of prior art approaches, the present invention provides a counter-intuitive method and system for introducing a maximized liquid component dosage, whether water and/or chemical admixture (e.g., cement plasticizer), into a concrete mix load just before the pour event at the construction delivery site and for achieving a maximized slump increase before the pour event and more preferably just before arrival at the pour site. The present inventors believe that the present invention enables faster and more reliable corrections to concrete during transit delivery to the job site. This is achieved by programming the concrete monitoring system processor with two important aspects in mind.

In the first aspect, the system processor retrieves a slump characteristic (such as slump, slump flow, viscosity, yield stress or other rheology measurement) from previously and recently recorded deliveries (e.g. deliveries prior to the current delivery within the same day). This data includes a slump (for example) value before addition of chemical admixture, a slump value after the addition of the chemical admixture, the volume of chemical admixture added to create the change in slump, and the volume of concrete to which the chemical admixture was added. It will be understood by those skilled in the art that the slump value after the addition of the chemical admixture is determined after the chemical has been mixed throughout the concrete volume. It is also understood that the data may be comprised of combinations of such data, for example, ounce per cubic yard ($oz/yd^3$ or other chemical volume per concrete volume) for one inch gain in slump or slump gain in inches per one $oz/yd^3$ of chemical. The slump data may also include other information such as mix design parameters (e.g. cement content) and/or truck characteristics (e.g. mixer drum type). It will be understood by those skilled in the art that chemical admixtures respond differently to different cementitious and truck systems. In addition, performance data, such as current air content (See e.g., US 2014/0297204), density, and viscosity can also be used as qualifying factors. The system process employs this retrieved data to enable the monitoring system to achieve target performance more quickly by considering certain factors, including the time needed for administering an admixture dose and the resultant effect on slump of the dosage administered, all without sacrificing accuracy. This is indeed important because every dose of admixture requires time to introduce (addition) and time to mix in (to obtain homogeneity or uniformity) throughout the load of the concrete mixture contained within the mixer drum. Multiple additions can take considerable amounts of time to accomplish. The effectiveness of small, multiple dosages may be overcome by changes in the concrete (e.g. slump loss) because of the amount of time it takes to administer the doses. Thus slump loss can also be used to determine the amount of chemical admixture to be added.

If small amounts of liquid cement plasticizer (e.g., water) were used for a concrete having high slump loss, moreover, it was previously thought that the overall slump loss could overcome any gains achieved through using smaller plasticizer additions. It was previously taught in U.S. Pat. No. 8,311,678 that conservative doses should be used, and thus incremental doses were used at 85% of the hypothetical dose amount predicted for a given performance target. This was preferred, in particular for water addition, since overdosing water into concrete significantly reduces strength of the resultant hardened concrete.

For minimizing risk of overshooting a target slump value, the present inventors believe that data from past deliveries, preferably taken within the same day as a current delivery operation for which the present invention is employed, can be used advantageously by the concrete monitoring system processor to reduce the risk associated with adding a higher dosage amount, and can also reduce the number of additions required to achieve a target slump value. For example, instead of 85% of the predicted dose, a higher percentage such as 95% of admixture may be administered into the concrete load, preferably just before arriving at the delivery site, so that the slump target can be reached at or moments just before the pour (discharge) time. Furthermore, larger increases in slump can be achieved. Currently, systems often increase slump at small intervals such as 1 or 2 inches. The present invention allows accurate dosing to achieve much larger slump intervals, including slump gains larger than 4 inches.

The second aspect of the present invention is the surprising discovery that it is more "dose efficient" (i.e., to use the smallest total amount of chemical cement dispersant admixture, over the delivery of the particular load, to achieve a given target slump at the time of discharge/pour) to add the chemical admixture as late as possible in the delivery operation. And even more surprising was the discovery that, with the same amount of concrete material (including chemical admixture) and same mixing time, the strength was improved when the admixture was added as late as possible.

This second aspect is better understood by comparing two cases wherein a concrete delivery truck is batched with a given concrete mix having an initial slump of three inches. In the first case, the slump of the concrete mix load is increased to eight inches initially and as quickly as possible, and subsequent additions and mixing of chemical cement dispersant admixtures are dosed into the concrete load during transit to maintain the slump at eight inches during transit to the delivery site. In the second case, the slump is maintained at three inches for the initial phase of transit from the batch plant to the jobsite, and just before arrival at the jobsite the slump is increased suddenly towards the target slump value by addition of a majority percentage of the total chemical admixture (e.g., at least 51% of total admixture used to attain target slump value in the concrete mix load at the time of discharge/pour). In this manner, the concrete is ready to be poured at the time of arrival. If job-site delays occur, the estimated time delay can be factored into the calculation of admixture addition by the slump monitoring system processor.

The PRIOR ART early addition approach (Case 1) and late addition approach of the present invention (Case 2) are comparatively illustrated in FIG. 1. The present inventors surprisingly discovered that, for the same concrete mix and target slump value, a smaller total amount of chemical cement dispersant admixture is required by the late addition approach of the present invention (Case 2) and promoted hydration which encouraged higher strength.

Thus, an exemplary method of the present invention for dosing a cement plasticizer chemical admixture into a concrete load contained in a delivery mixer truck using a processor-controlled system and a delivery mixer truck mixer drum, comprises: (A) providing a concrete mix load into the rotatable drum of a delivery truck, the concrete mix load having a known volume; (B) providing a processor-accessible database having data sets obtained from at least four doses, wherein a data set comprises a slump characteristic before the addition of a chemical admixture, a slump characteristic after the addition of a chemical admixture, the volume of chemical admixture added to achieve the change in slump characteristic, and the volume of concrete to which the chemical admixture was added, or combinations thereof; (C) monitoring the concrete mix load in the truck drum during transit at least every five minutes from at least batching until dosing of the chemical admixture using a processor unit to calculate the time-to-administer admixture dose (which is designated by $t_a$) for the concrete mix load based upon (i) a scheduled pour time (which is designated by $t_p$); (ii) the slump characteristic increase (which is designated by $\Delta S$) required to achieve the target slump characteristic at pouring wherein the slump characteristic increase is calculated using the relationship $\Delta S = S_T - S_c$ wherein $S_T$ represents target slump characteristic and $S_c$ represents current slump characteristic of the concrete mix load during transit; (iii) the dosage required to achieve the slump characteristic increase ΔS (which is designated by $D_{AS}$) which is based on the current slump characteristic (which is designated by $S_C$), and the data described above in Step (B); wherein the time-to-administer admixture dose (which is designated by $t_a$) is calculated by the relationship $t_a=t_p-t_h$, where $t_h$ is based on at least the time required to add the chemical admixture; and (D) administer the admixture dose when the current time ($t_c$) equals or exceeds the time-to-administer ($t_c \div t_a$) such that the following relationship is satisfied: $D_{AS}>D_c/(t_c-t_b)\times(t_p-t_a)$ wherein $t_c$ represents the current time, $t_a$ represents the time-to-administer admixture dose, $D_{AS}$ represents the dosage required to achieve a target slump characteristic from a current slump characteristic, $D_c$ represents the total cumulative admixture dosages since time of batching ($t_b$) up to current time ($t_c$), and $t_p$ represents the time at which the concrete load is scheduled to be poured.

The present invention also provides a system for dosing a liquid plasticizer chemical admixture into a concrete load contained in a delivery mixer truck using a processor-controlled system and a delivery mixer truck mixer drum, comprising: a processor unit, at least two sensors in communication with the processor unit to enable monitoring of a slump characteristic of a concrete load contained in a delivery mixer truck mixer drum and to enable monitoring of at least one rotational property of the mixer drum, and a liquid dispenser control in communication with the processor unit for introducing a liquid plasticizer chemical admixture into a concrete load contained in a delivery mixer truck, the processor unit being programmed to perform the method, having steps A through D, as described above.

Further advantages and features of the present invention are described in detail hereinafter.

BRIEF DESCRIPTION OF DRAWINGS

An appreciation of the benefits and features of the invention may be more readily comprehended when the following written description of preferred embodiments is considered in conjunction with the drawings, wherein.

DETAILED DESCRIPTION OF EXEMPLARY EMBODIMENTS

As used herein, the phrase "chemical cement plasticizer admixture" (or variations such as "cement dispersant chemical admixture" or "chemical admixture") refers to a polymeric dispersant admixture which reduces the amount of water required for achieving a certain slump or workability in a given concrete mix. Such water-reducing admixtures, otherwise termed water reducers, have been used in the concrete industry for decades. Terms such as "chemical admixture" as used herein will be understood to include so-called cement plasticizers and/or superplasticizers (the latter of which refers to replacement of larger water portions within the concrete mix).

The term "slump" as used herein will refer to the property of concrete workability, such as determined using the conventional vertical drop measurement of concrete using standard inverted cone; but this could also include "slump flow" whereby workability is determined using horizontal spread measurement of concrete when released from cone. The term "slump characteristic" may be used also to refer to either or both of these rheological properties and to emphasize that the present invention is not limited necessarily to either slump or slump flow measurements or monitoring, but can comprehend related rheology values such as yield stress as well. The term "slump" is used for sake of convenience herein in referring to concrete rheology and concrete management/monitoring systems.

Automated concrete slump management (monitoring) systems for managing slump or other rheological properties are commercially available, for example, from Verifi LLC, 62 Whittemore Avenue, Cambridge, Mass., USA, which has disclosed various automated concrete monitoring methods and systems in the patent literature, such as U.S. Pat. Nos. 8,020,431; 8,118,473; 8,311,678; 8,491,717; 8,727,604; 8,764,273; 8,989,905; as well as U.S. Ser. No. 11/834,002 (Publ. No. US 2009/0037026 A1); U.S. Ser. No. 258,103 (Publ. No. 2012/0016523 A1); U.S. Ser. No. 14/052,289 (Publ. No. 2014/0104066 A1); U.S. Ser. No. 14/052,310 (Publ. No. 2014/0104972); PCT/US2015/025054 (Publ. No. WO 2015/160610 A1); and PCT/US2014/065709 (Publ. No. WO2015073825 A1).

Alternatively, the slump monitoring system may be based on use of a force sensor which is mounted within the drum, as taught for example in U.S. Pat. No. 8,848,061 and US Publication No. 2015/0051737 A1 of Berman (Sensocrete Inc./GCP Applied Technologies), U.S. Pat. No. 9,199,391 of Denis Beaupre et al. (I.B.B. Rheologie Inc.), or US Publication No. 2009/0171595 and WO 2007/060272 of Benegas.

Figure 9:
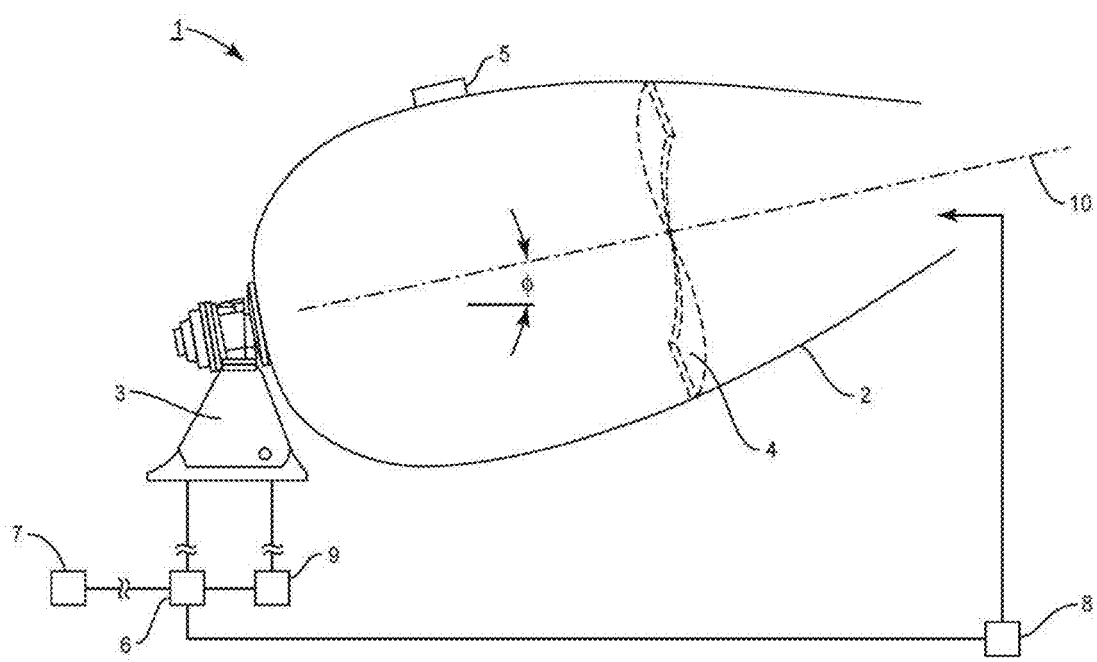
FIG. 9 is an illustration of components of an exemplary system of the invention.

An exemplary automated concrete slump management (monitoring) system of the present invention is illustrated in FIG. 9. The exemplary system comprises one or more processor units 6 which are electrically or wirelessly connected to receive signals from the motor or hydraulic pressure drive 3 as well as to control the speed of the motor/drive 3 which rotates the mixer drum 2. The processor unit 6 is electrically or electronically connected to one or more memory locations 7, which can be used for storing program applications for monitoring and controlling the motor or hydraulic pressure drive 3 (thereby adjusting the speed of rotation of the drum 2), and the processor unit 6 is electrically connected or electronically connected to one or more dispensing systems 8 for administering water, chemical admixtures, or both into a concrete mix contained in the mixing drum 2. The system 1 preferably comprises a rotational monitoring unit 5, such as gyroscopic rotational measuring device, to measure the rotation of the drum 2 during standard operation. In a further exemplary embodiment of the invention, the rotational monitoring unit 5 is mounted directly onto the drum 2. The unit 5 may also be mounted, such as by adhering or fastening, in or on a rotatable vessel or container at a location which is not coincidental with its rotational axis. In an embodiment, the unit 5 is mounted at a distance from its rotational axis; and greater accuracy will be provided by larger distances from the rotational axis of the rotatable drum 2. As the drum 2 is driven by the motor 3, the drum rotates about the rotational axis 10, the monitoring unit 5 measures the angular velocity of the drum 2. The monitoring unit 5 is configured to provide an output signal corresponding to the measured angular velocity.

To date, the vast majority of concrete manufacturers do not employ automated concrete slump management/monitoring systems on their ready-mix concrete delivery trucks. The following sections will compare prior art water and/or chemical admixture dosing processes with and without the use of such automated slump monitoring systems.

The following terms will be used to describe the present invention and are listed for convenient reference and defined as follows:

Slump characteristic—a rheology measurement such as slump, slump flow, yield stress, viscosity, etc.

Current time ($t_c$)—the time at which the system processor is currently implementing the exemplary methods of the present invention (during transit delivery operation).

Time of batching ($t_b$)—the time at which the concrete in the current concrete mixer drum delivery truck was initially batched (components assembled and mixed in drum).

Time-to-administer ($t_a$)—the time at which a majority of cement plasticizer chemical admixture (percentage of total dosage) is to be administered (added into the concrete).

Pour time ($t_p$)—the time at which the concrete is poured or discharged from the concrete mixer drum of the delivery truck.

Time required to add the chemical admixture ($t_h$)—the time required to make the addition (dosing) of the cement plasticizer chemical admixture into the concrete. This may include the time it takes to pump and administer the chemical admixture into the drum, the time required to mix the chemical admixture throughout the concrete volume (to attain state of homogeneity within the concrete mix load), other time period due to meeting ASTM C94-16a (e.g., required numbers of rotation to mix in the admixture), or combinations thereof.

Target slump characteristic ($S_T$)—the desired slump characteristic of the concrete at the pour time when the concrete is to be discharged.

Current slump characteristic ($S_C$)—the current slump characteristic of the concrete at current time.

Slump characteristic increase ($\Delta S$)—the increase in slump characteristic required to bring the current slump characteristic to the target slump characteristic.

Total cumulative admixture dosages ($D_C$)—the total cumulative cement plasticizer chemical admixture dosage amount administered since batching time to current time.

Dosage required to achieve target slump ($D_{\Delta S}$)—the dosage amount of cement plasticizer chemical admixture estimated to change the slump characteristic from the current slump characteristic value to the target slump characteristic value.

Figure 1:
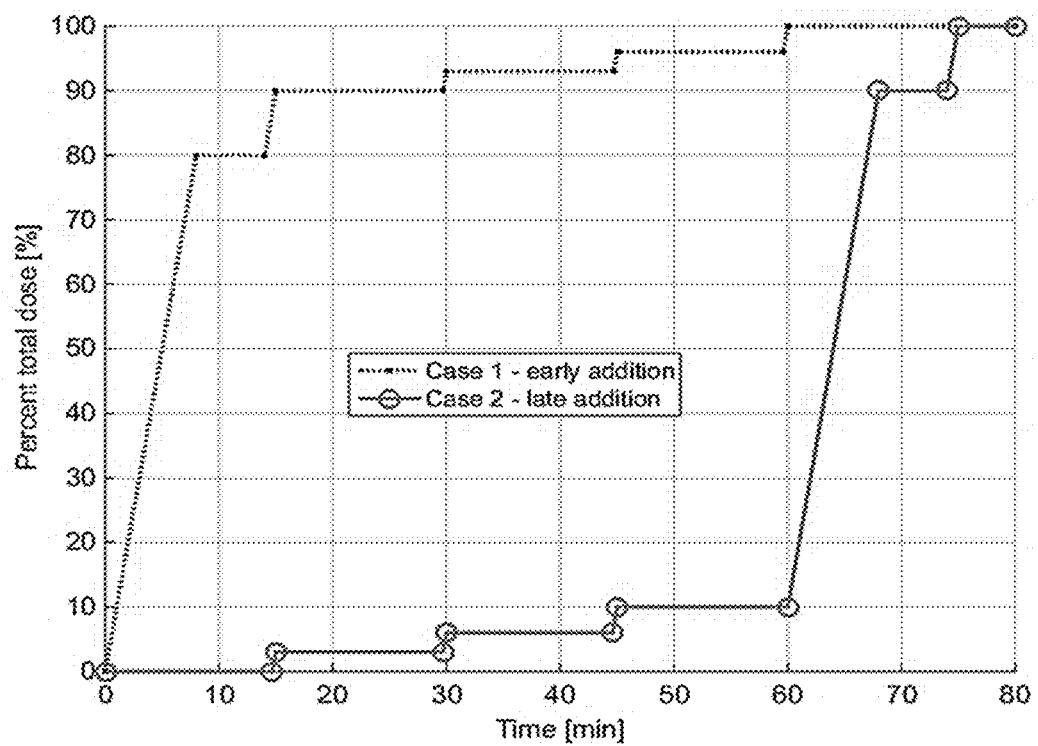
FIG. 1 is a comparative graph illustration of two curves: the upper curve representing a PRIOR ART approach wherein early addition of chemical cement plasticizer admixture is done to reach target slump at beginning of delivery of a concrete mix load (Case 1); and the lower curve representing an exemplary process of the present invention wherein initial slump and admixture doses are initially low and a majority percentage (≥51% by weight) of total cement dispersant chemical admixture is added near the end of the delivery to maximize slump attainment in the concrete load just prior to discharge/pour (Case 2)

As illustrated in FIG. 1, the most common PRIOR ART approach to dosing chemical cement plasticizer admixtures in typical concrete delivery operations equipped with a slump monitoring system and a fluid dispensing system involves early addition of a majority percentage of the total cement plasticizer admixture dosage, as seen in the uppermost curve (Case 1). In Case 1, eight percent (80%) of the total chemical admixture dosage is added during the first minutes of the delivery operation to increase the slump of the concrete mix load to or towards the target slump value, which is the slump desired at pour (discharge). Although there is risk involved with making large additions into the concrete mix at any point, particularly when the response of the concrete is not understood, time is required for adjusting the concrete during transit and up to the discharge/pour event for Case 1. In this case, the chemical addition is shown to be added in a cautious or conservative manner, as much time was allotted for additional adjustments before site arrival.

On the other hand, an exemplary late stage addition according to the present invention is represented by the lower curve (Case 2) in FIG. 1, wherein it is seen that initial slump and initial addition percentage amounts of the total chemical admixture dosage are initially low; but wherein a majority percentage of the total cement plasticizer admixture dosage is added near the end of the delivery to maximize slump attainment in the concrete load just before it is discharged/poured. Thus, in Case 2, the slump is adjusted close to and under the target slump value, and, subsequently, a small addition of plasticizer admixture can be dosed to attain target slump just before the discharge/pour event. Since the present inventive methods and systems of the present invention employ historical data (e.g., preferably the transit slump monitoring data obtained from earlier in the day based on same concrete mix design and same truck design), the large chemical addition can be added with confidence and thereby achieve higher dosage efficiency and strength without sacrificing accuracy of the final slump.

Figure 2:
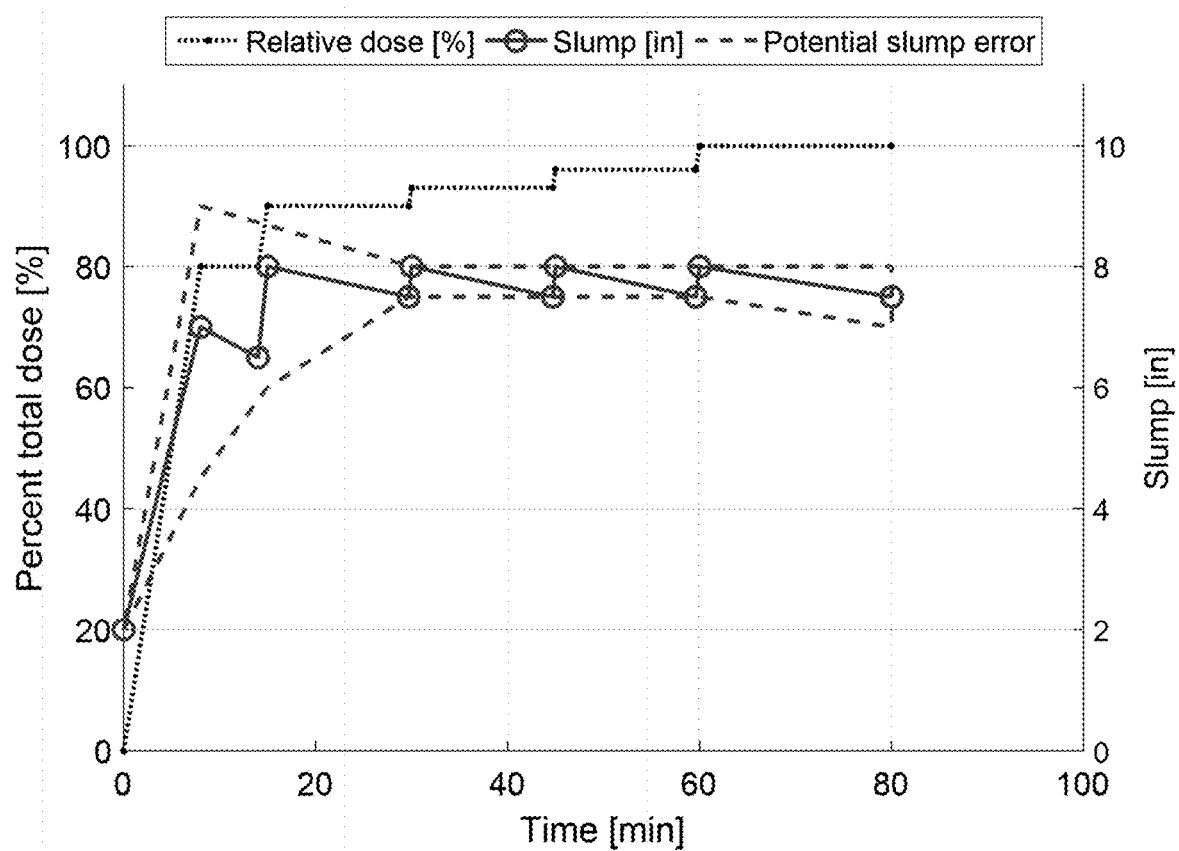
FIG. 2 is a graph illustration of another PRIOR ART concrete delivery process wherein a majority percentage of total cement plasticizer admixture dosage is added at the beginning of the delivery process and smaller additions (finely-dotted line) of admixture are required to maintain slump (continuous line) at or near the target slump at 60 minutes before discharge/pour, and the coarsely-dotted lines depict a relatively small slump variation.

As further detailed in FIG. 2, the PRIOR ART methods wherein most of the liquid component (whether water and/or chemical admixture) are dosed heavily at the start of the delivery operation, and then maintained with the use of an automated slump monitoring system can achieve an accurate final slump (to meet target slump at discharge/pour) which is denoted by the coarsely-dotted lines with an optimized chemical dose and strength.

Figure 3:
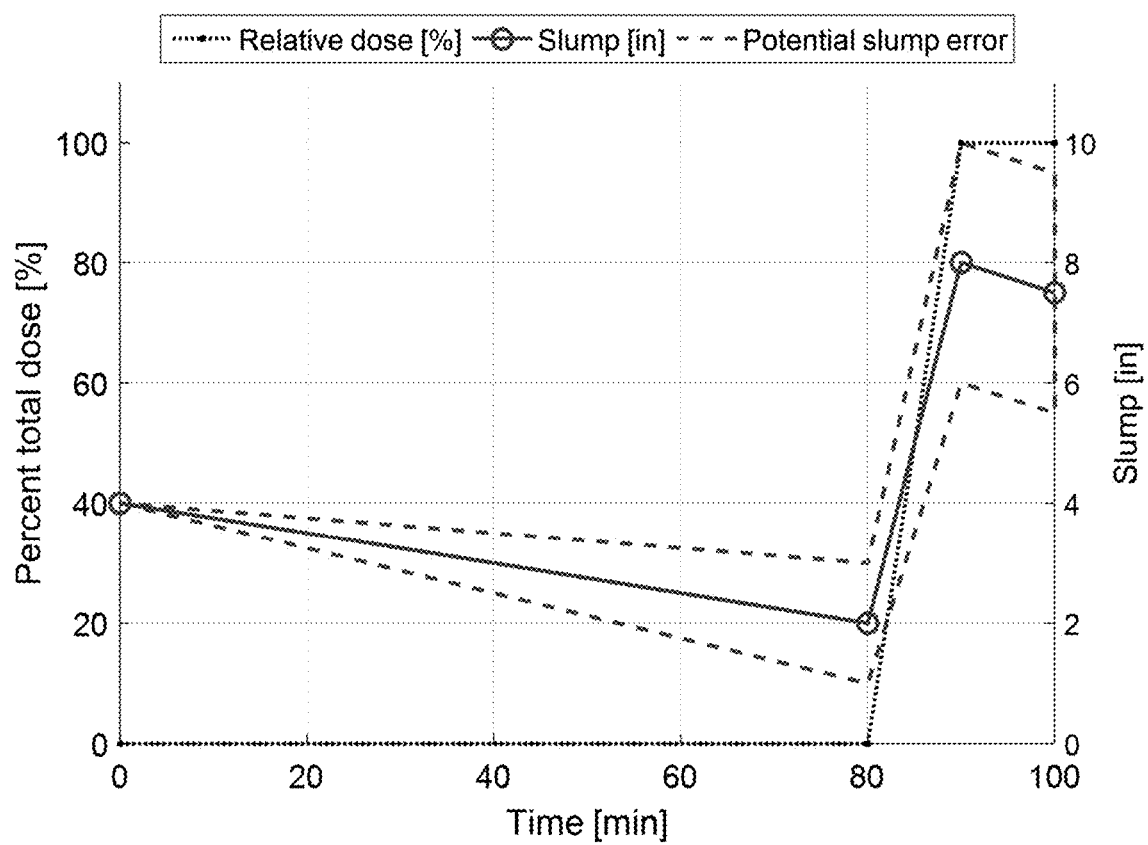
FIG. 3 is a graph illustration of a PRIOR ART concrete delivery process wherein slump is not monitored during transit and sixty percent (60%) of the total admixture dose is added manually (not by processor-controlled system) into the concrete at a time after the delivery truck reaches the delivery site, whereby a large slump variation exists (coarsely-dotted lines)

FIG. 3 illustrates another PRIOR ART concrete delivery process wherein the slump of the concrete load in the truck mixer drum is not monitored during transit. At the outset, forty percent (40%) of the total cement plasticizer admixture dosage is added into the concrete, which is transported with a slump between 2-4 inches, as measured on the right vertical axis of the graph. Towards the end of the delivery, approximately sixty percent (60%) of total cement plasticizer admixture is dosed manually (not by an onboard processor-controlled concrete management system) into the concrete load at a time after the delivery truck has reached the construction delivery site. In comparison with the solid line, which represents ideal or hoped-for slump behavior, there exists in actual conditions a large variability in slump as suggested by the region defined within the dashed lines. Instead of the attaining the slump target of eight (8) inches, the slump of the concrete could reside somewhere within a wide margin of error that is up to two inches or more beyond or below the target slump value. Additionally, considerable time will be required after arrival of the truck at the delivery site to adjust the concrete mix load so that it will attain the slump target. The accuracy required to attain the slump target is not possible without the ability to monitor (measure) slump, to add admixture, and to employ historical slump monitoring data from previous deliveries.

Figure 4:
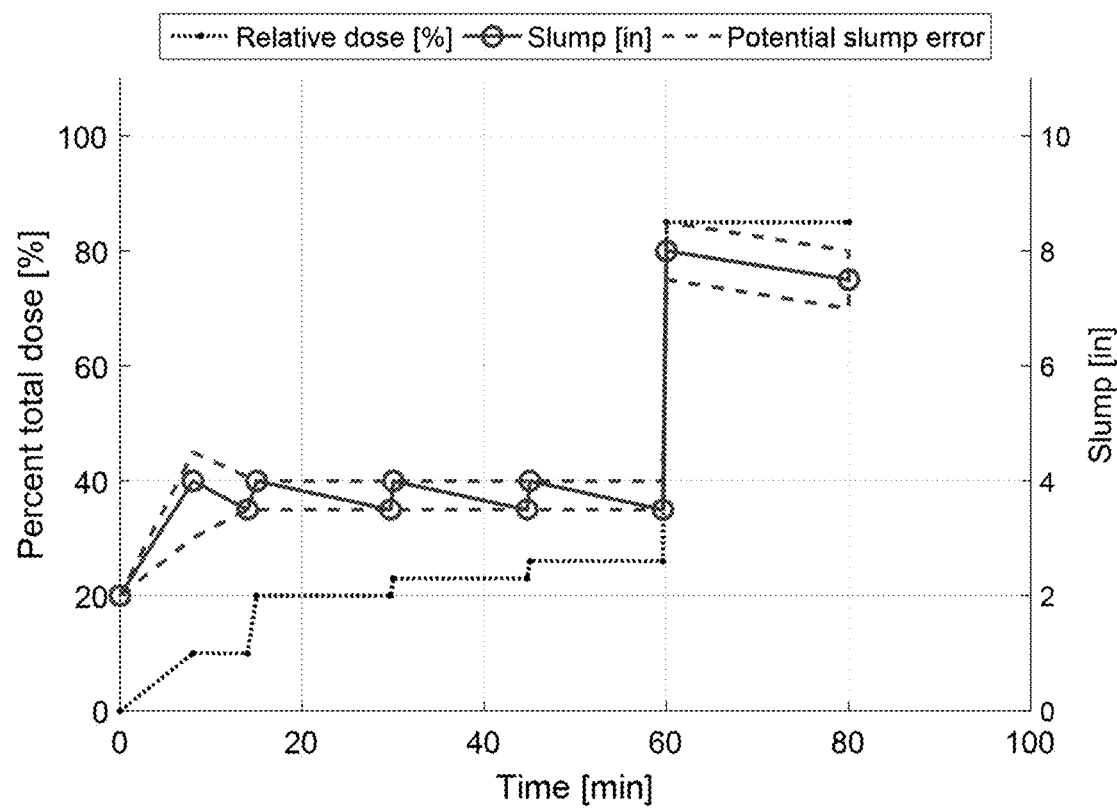
FIG. 4 is a graph illustration of an exemplary process and system of the present invention wherein slump (solid line) is monitored during transit and seventy-six percent (76%) of the total admixture (finely-dotted line) is added just before the delivery truck reaches the delivery site, and maintains a relatively small slump variation (coarsely-dotted lines) through use of data from previous loads.

In contrast to the PRIOR ART process illustrated in FIG. 3, the PRIOR ART delivery process illustrated in FIG. 4 employs an automated slump management system which is onboard the delivery truck, such that the incremental dose additions of liquid component (e.g., chemical admixture) can be monitored during delivery. As shown in FIG. 4, a large portion of the total cement plasticizer admixture dosage is added during transit, as monitored by the slump management system. Without the benefit of the present invention, the slump can be maintained at a slump of four (4) inches, and sixty percent (60%) of the total chemical admixture dosage can be added using guesswork or approximation at sixty minutes, for example; but, without the benefit of the use of the process of the present invention, there still could be required up to 20 minutes after arrival at the delivery site for adjusting the concrete to the slump target value, due to the presence of a large margin for error.

Figure 5:
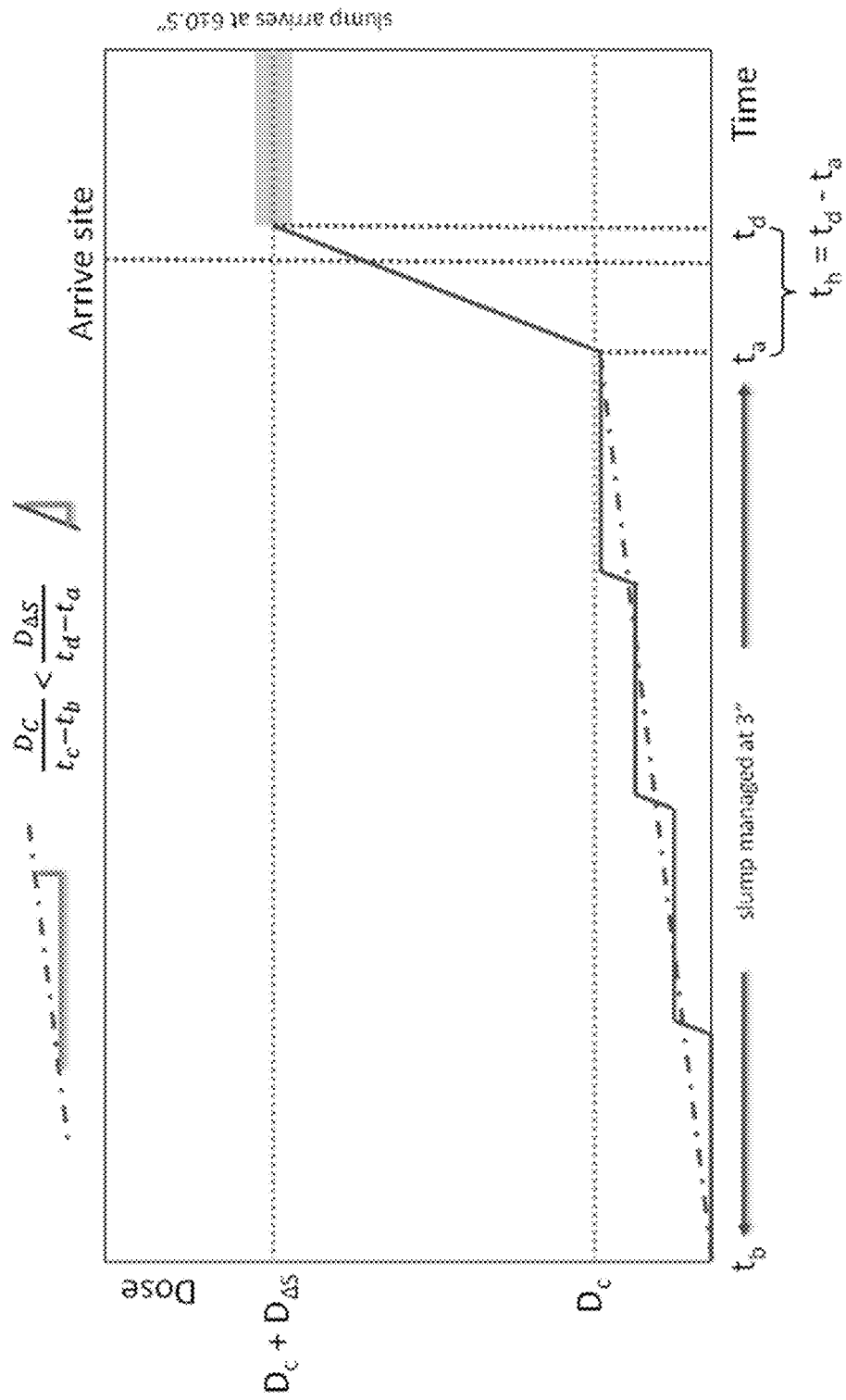
FIG. 5 is a graph illustration of an exemplary process and system of the present invention wherein the slump management system processor is programmed to consider factors including anticipated pour time ($t_p$), time-to-administer the dosage of chemical admixture ($t_a$), and time required to ensure homogeneity of the concrete ($t_h$), wherein a majority percentage of the total admixture dosage is added preferably just before arrival at the delivery pour site (before "Arrive site") and the slump of the delivery concrete is maximized just before anticipated pour (where the pour time is designated as $t_p$)

As illustrated in FIG. 5, an exemplary process and system of the present invention involves the use of a concrete slump management system (e.g., system for monitoring rheology properties including but not limited to slump, slump flow, viscosity, yield stress or combination thereof) wherein the system processor is programmed to carry out a process that involves taking the following factors into account to compute when (the time-to-administer the dosage of chemical admixture ($t_a$)) and how much chemical cement dispersant admixture to dose into the concrete load): these include an estimated time to pour ($t_p$), and the time required to ensure homogeneity of the concrete load ($t_h$). Consideration of these factors will permit the slump management system to dispense a large portion and more preferably a majority percentage of the total cement dispersant admixture dosage amount just before arrival of the concrete load at the delivery site (before "Arrive site"), such that the slump of the delivered concrete is maximized just before delivery/pour (wherein the discharge time, or time of discharge/pour, is designated as $t_p$). It will be understood by those skilled in the art that chemical admixtures respond differently to different concrete mix designs and truck system designs; and therefore, that the required amount of chemical cement dispersant to be added is preferably calculated based on historical chemical dosing events knowing qualification factors such as mix design parameters (e.g. cement content) and mixer truck parameters (e.g. mixer drum type) in addition to slump behavior as reflected in historical data. Furthermore, current plastic concrete data, such as air content (as measured, for example by US 2014/0297204), density, and viscosity can also be used as qualifying factors. This dosage data includes the slump before a chemical addition, the slump after a chemical addition, the volume of chemical added to achieve the slump after the chemical addition and the concrete volume to which the chemical admixture was added. It will be understood by those skilled in the art that the slump value after the addition of the chemical admixture is determined after the chemical has been mixed throughout the concrete volume. It is also understood that the data may be comprised of combinations of such data, including, for example, oz/yd$^3$ (chemical volume per concrete volume) for 1" gain in slump or slump gain in inches per 1 oz/yd$^3$ of chemical.

As seen in FIG. 5, the slope of the dose curve reflects effects of scheduled admixture dosing, and this dose curve is seen as the solid plotted line increasing in step-wise fashion along the horizontal axis (time) as sequential dosing of chemical admixture before the majority percentage dose is added into the concrete load at the point in time designated as $t_a$, when plotted as a function of time before $t_a$, is the cumulative dose ($D_c$) divided by the time interval between the time-to-administer ($t_a$) a majority percentage of the overall chemical admixture amount and time of batching ($t_b$). Preferably, the slope of the dose curve reflecting the admixture dosing schedule after the cumulative dose ($D_C$) is calculated as the dose required to increase slump ($D_{\Delta S}$) to the target slump, divided by the amount of time between the time of pour ($t_p$) and the time to time-to-administer ($t_a$). If the slope of the curve which reflects the chemical admixture dosing schedule before the time-to-administer the admixture into the concrete load ($t_a$) is less than the slope of the curve after the time-to-administer ($t_a$), then dosage amount occurring after $t_a$ will need to be larger than occurring before $t_a$. This means that a larger (majority) percentage of total chemical admixture will be added after the time-to-administer point. The present inventors caution that the slump after the large admixture dose should not, especially where concrete volume in the drum is high, exceed any "spill slump" limit, whereby concrete otherwise sloshes out of the drum.

Figure 6:
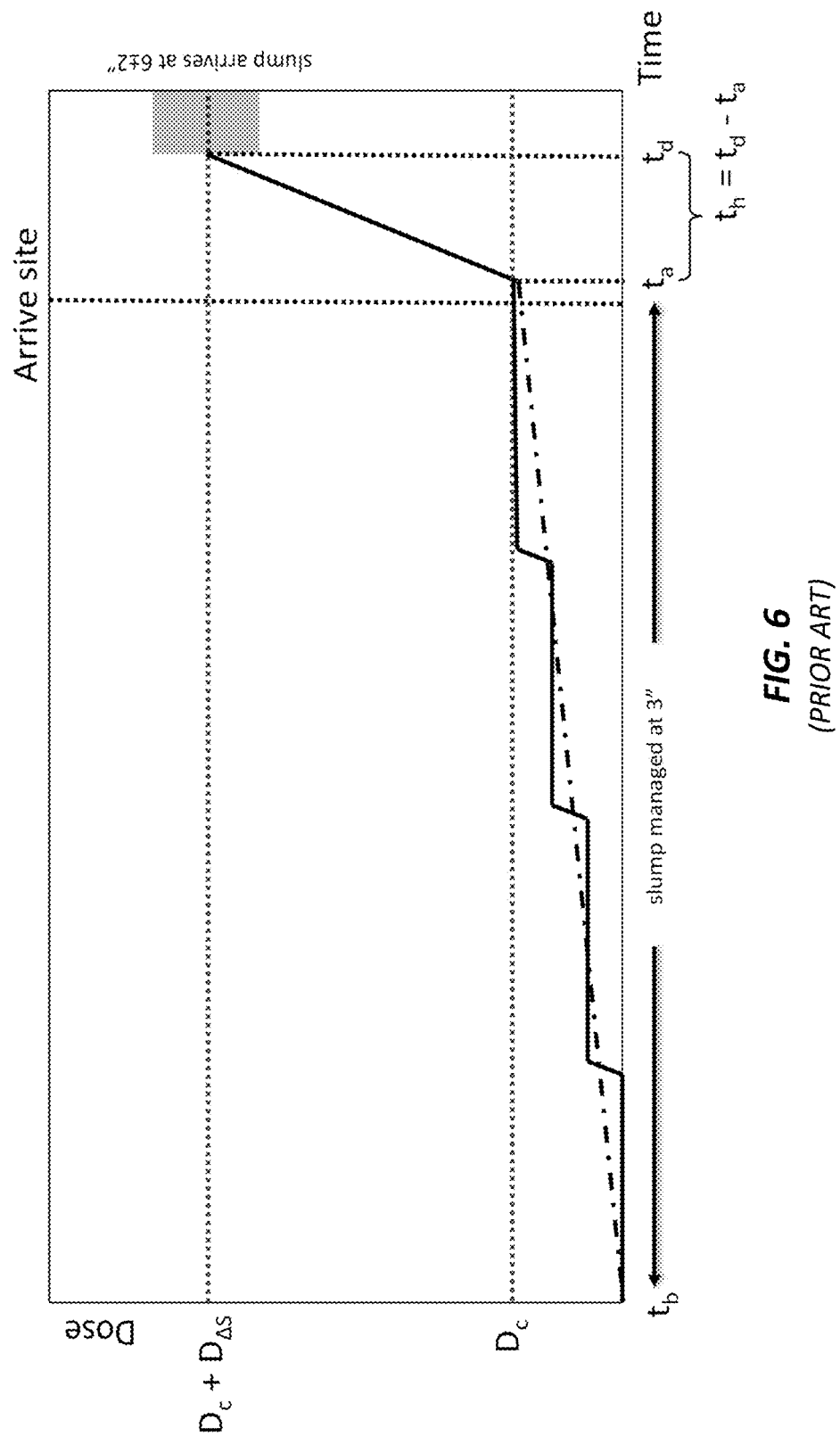
FIG. 6 is a graph illustration of a PRIOR ART process wherein a maximized slump increase is attempted at the end of the delivery operation, but slump target is not met due to variability of slump at the time of discharge/pour (shaded region), and a delay occurs of the time required to dose the chemical and allow the chemical to mix into the concrete.

FIG. 6 is a graph illustration of a PRIOR ART process wherein slump increase is attempted at the end of the delivery operation, but the slump target is not met at the time of discharge/pour due to variability in the slump. Admixture dosage efficiency and concrete strength are not attained. The slump of the concrete load is kept at three inches (3") before the truck arrives at the site, and the time to administer ($t_a$)

the chemical admixture dosage begins after arrival of the delivery truck at the site. This results in a time delay, which can compound delays of future deliveries.

Figure 7:
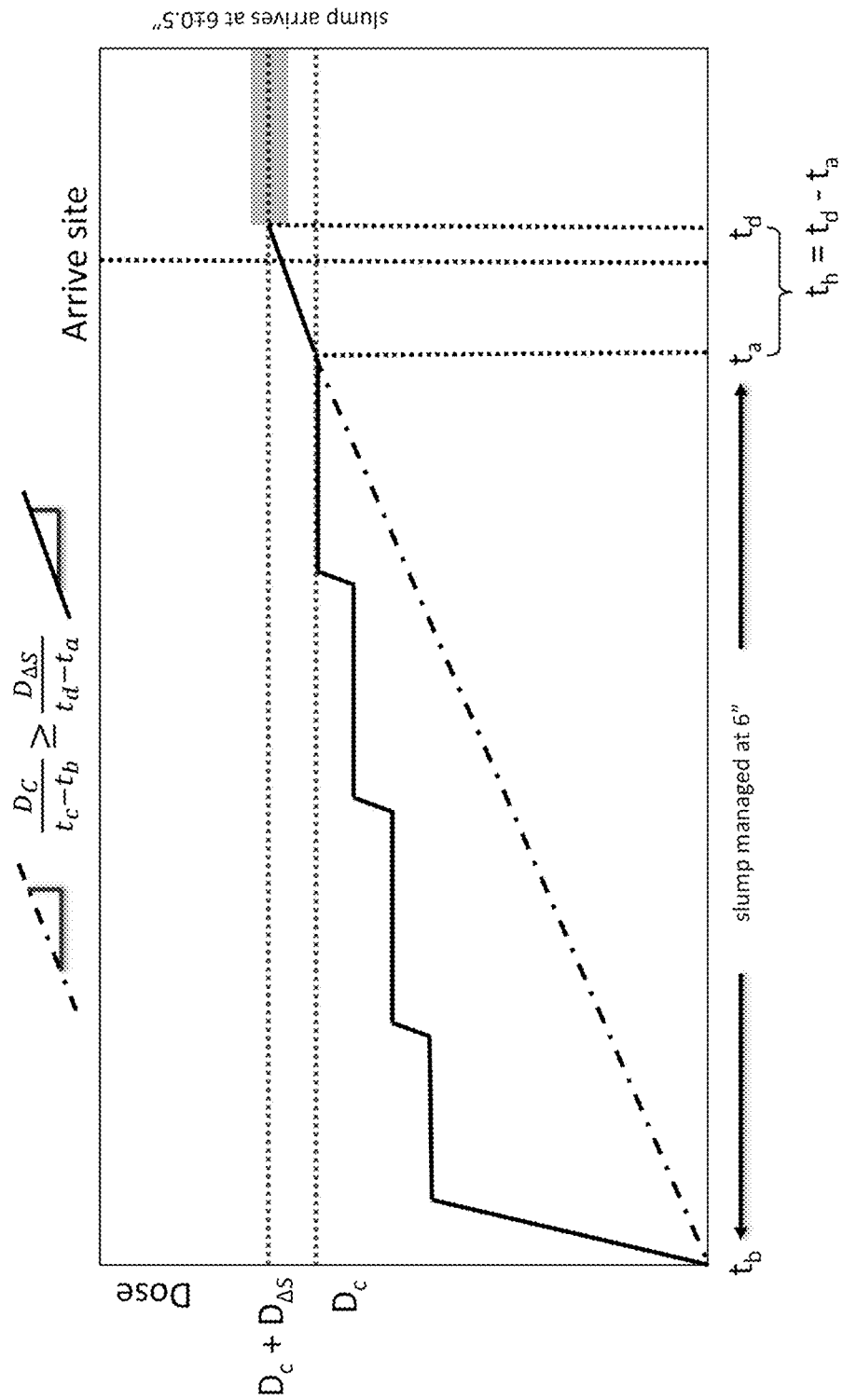
FIG. 7. is a graph illustration of a PRIOR ART approach wherein a large percentage amount of total admixture dosage is added into the concrete near the beginning of delivery, resulting in target slump value being met (within an acceptable margin of +/−0.5 inch of slump) but maximized slump (e.g., at 6 inches) is attained early and for the remainder of the transit delivery operation.

FIG. 7. is a graph illustration of a PRIOR ART approach wherein a majority percentage of the total overall cement dispersant admixture dosage is added into the concrete towards the beginning of the delivery operation, which results in target slump value being met within an acceptable margin of +/−0.5 inch of slump, but maximized slump (e.g., at 6 inches) is attained early and for the remainder of the transit delivery operation, which results in a less than optimal dose efficiency and strength in the concrete.

Figure 8:
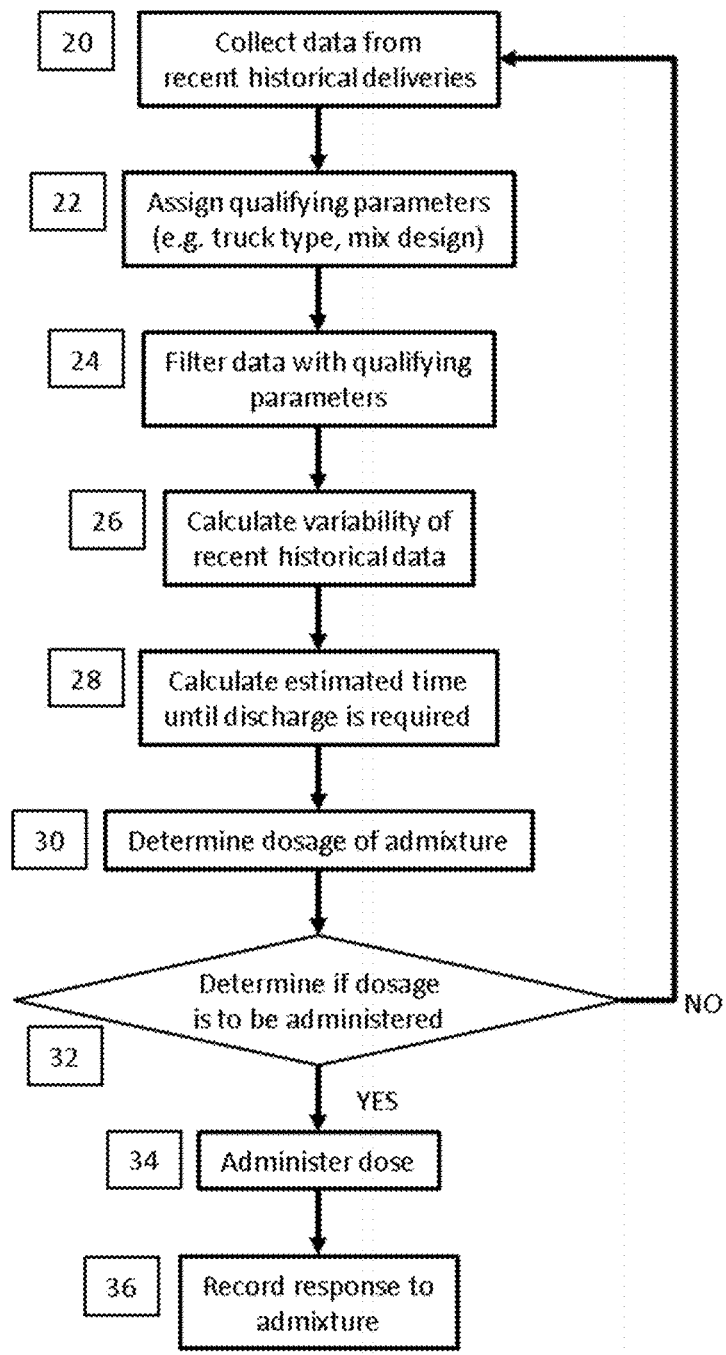
FIG. 8 is a block diagram which illustrates an exemplary process of the present invention.

FIG. 8 is a block diagram which illustrates an exemplary process of the present invention. Preferred processes of the invention involve the automated slump management processor performing the following procedures. The processor collects data from recent historical concrete deliveries on the same truck or from similar trucks within the fleet on the same day (block 20); and, most preferably, involving deliveries occurring earlier in the day and involving the same concrete mix design; and this data is stored in processor-accessible memory (such as at a central station or in the cloud). Preferably, the data is stored along with certain qualifying parameters or tags, such as delivery truck type, concrete mix design, etc. (block 22) that can be retrieved and filtered by the truck system processor or other processor which is in communication with the slump management system processor (block 24). The system processor or other process in communication with slump management system processor is preferably programed to calculate variation or average margin of error in the recent historical data stored in memory (block 26). The margin of error can be used for calculating or scheduling the time until discharge (pour) is required (block 28). The system processor considers the current slump and the target slump desired at pour, and determines the amount of water and/or chemical admixture required to increase slump of the concrete load in the truck mixer drum to the target slump (block 30), which may also incorporate the variability data calculated in block 30. If the system processor determines that it is not yet time to administer the majority percentage chemical admixture dose (block 32), then the processor returns to initial step 20 again until it is time to administer the dose (block 34). The system records the response or effect of the administered chemical admixture dose upon the concrete load and stores this into processor-accessible memory (block 36) where it can be used as part of the recent historical deliveries (See block 20).

FIG. 9 is an illustration of components in an automated concrete slump management system 1 for accomplishing the purposes of the present invention. The system for dosing a liquid cement plasticizer chemical admixture into a concrete load contained in a delivery mixer truck using a processor-controlled system 1 and a delivery mixer truck mixer drum 2 (the truck is not shown), comprises: a processor unit 6, at least two sensors (5,9) in communication with the processor unit 6 to enable monitoring of the slump of the concrete load contained in a delivery mixer truck mixer drum 2 and to enable monitoring of at least one rotational property of the mixer drum 2, and a liquid dispenser control 8 in communication with the processor unit 6 for introducing a liquid plasticizer chemical admixture into a concrete load contained in a delivery mixer drum 2, the processor unit 6 being programmed to perform the method as described above.

Preferably, the sensor is a hydraulic pressure sensor (designated at 9), and, more preferably, one hydraulic pressure sensor is mounted on the charge pressure port and a second hydraulic pressure sensor is mounted on the discharge pressure port of the hydraulic motor 3 used for rotating the mixer drum 2 (See e.g., US Publication No. 2014/0104972 owned by the assignee hereof, disclosing use of charge and discharge hydraulic pressure sensors). A second sensor for sensing rotational states of the mixer drum is designated at 5 and is preferably based on the use of an accelerometer as taught in U.S. Pat. No. 8,727,604 and/or gyroscope unit as taught in WO 2014/073825 A1.

Alternatively, the slump monitoring system may be based on use of a force sensor which is mounted within the drum, as taught for example in U.S. Pat. No. 8,848,061 and US Publication No. 2015/0051737 A1 of Berman (Sensocrete Inc./GCP Applied Technologies), U.S. Pat. No. 9,199,391 of Denis Beaupre et al. (I.B.B. Rheologie Inc.), or US Publication No. 2009/0171595 and WO 2007/060272 of Benegas.

Thus, an exemplary method of the present invention for dosing a cement plasticizer chemical admixture into a concrete load contained in a delivery mixer truck using a processor-controlled system and a delivery mixer truck mixer drum, comprises: (A) providing a concrete mix load into the rotatable drum of a delivery truck, the concrete mix load having a known volume; (B) providing a processor-accessible database having data sets obtained from at least four doses, wherein a data set comprises a slump characteristic (e.g., slump, slump flow, yield stress) before the addition of a chemical admixture, a slump characteristic after the addition of a chemical admixture, the volume of chemical admixture added to achieve the change in slump characteristic, and the volume of concrete to which the chemical admixture was added, or combinations thereof; (C) monitoring the concrete mix load in the truck drum during transit at least every five minutes from at least batching until dosing of the chemical admixture using a processor unit to calculate the time-to-administer admixture dose (which is designated by $t_a$) for the concrete mix load based upon (i) a scheduled pour time (which is designated by $t_p$); (ii) the slump characteristic increase (which is designated by $\Delta S$) required to achieve the target slump characteristic at pouring wherein the slump characteristic is calculated using the relationship $\Delta S = S_T - S_c$ wherein $S_T$ represents target slump characteristic and $S_c$ represents current slump characteristic of the concrete mix load during transit; (iii) the dosage required to achieve the slump characteristic increase $\Delta S$ (which is designated by $D_{\Delta S}$) which is based on the current slump characteristic (which is designated by $S_C$), and the data described above in Step (B); wherein the time-to-administer admixture dose (which is designated by $t_a$) is calculated by the relationship $t_a = t_p - t_h$, where $t_h$ is based on at least the time required to add the chemical admixture; and (D) administer the admixture dose when the current time ($t_c$) equals or exceeds the time-to-administer ($t_c \geq t_a$) such that the following relationship is satisfied: $D_{\Delta S} > D_c / t_c - t_b) \times (t_p - t_a)$ wherein $t_c$ represents the current time, $t_a$ represents the time-to-administer admixture dose, $D_{\Delta S}$ represents the dosage required to achieve a target slump characteristic from a current slump characteristic, $D_c$ represents the total cumulative admixture dosages since time of batching ($t_b$) up to current time ($t_c$), and $t_p$ represents the time at which the concrete load is scheduled to be poured.

Further exemplary methods of the invention include, in providing a processor-accessible database in Step (B), the processor-accessible database having data sets obtained from at least ten doses instead of four doses. While the invention may be carried out using data from four prior admixture doses, the present inventors prefer that more data be employed for increased accuracy. For example, the data of historic chemical admixture dosing and corresponding effect on slump characteristic can be obtained from truck-based slump monitoring system or systems during earlier deliveries on the same day, same week, or from within preceding weeks (according to preference of the slump system operator, central control manager, or programmer), preferably involving the same concrete mix, delivery truck designs and plastic properties (e.g. same air content). For example, a large construction operation may require 10, 20, 50, or 70 truckloads of concrete to be poured, such that the first ten deliveries (which could involve up to 10 different trucks which each use an automated slump monitoring system) could provide slump data, whereby a large percentage of the admixture is dosed according to the late stage addition process of the invention, but the actual amount administered is a percentage of the total calculated (85% as done at present), so that the actual slump increase is measured and the difference between predicted slump increase and actual slump increase is taken account by the slump monitoring processor for subsequent doses (within the same trucks as well as within the entire fleet of delivery trucks whose slump monitoring systems are in wireless communication with a central monitoring office or station), such that for deliveries subsequent to the tenth dosage, a larger percentage of the maximized dose (e.g., 95%) can be administered just before discharge/pour.

Other exemplary methods of the invention include, in providing a processor-accessible database in Step (B), the processor-accessible database having data sets obtained from at least fifty doses.

Instill other exemplary embodiments of the invention, the data sets used by the slump monitoring system processor can be filtered according to the preference of the system manager, operator, or supervisor. For example, factors that may be considered by the supervisor or manager, who is reviewing the slump monitoring system data which may be streamed into a central supervising or management office, and/or who may in turn alter the filters on the data used by the truck system processors, may include but not be limited to: (a) whether the truck/mixer combination or design has a large effect on the variation of data across the delivery fleet and concrete slump data; (b) whether the aggregate used in the concrete has wide variations in clay content that such that dosage efficiency of chemical admixture dispersant (e.g., particularly of the polycarboxylate polymer type) is adversely affected; (c) whether the concrete mix designs vary so widely (e.g., between residential mix having low cement content and special commercial mix having high cement content); and (d) other conditions or factors which would suggest that certain data should be filtered out from others when deciding what historical data to use for determining when and how much chemical admixture to administer during the late stages, in accordance with the present invention.

In further exemplary methods, in providing a processor-accessible database in Step (B), the processor-accessible database having data sets further includes information about the mix design of the concrete to which the chemical addition was made, information about the mixer drum to which the chemical addition was made, information about the mixer drive system which was used to rotate the mixer drum to which the chemical addition was made, information about the plastic concrete to which the chemical addition was made or combinations thereof.

In other exemplary methods, in monitoring the concrete in Step (C), the concrete mix load in the truck drum is monitored by the slump monitoring system processer at least every minute.

In still further exemplary methods, in monitoring the concrete in Step (C), the concrete mix load in the truck drum is monitored from at least batching to discharging of the concrete.

Further exemplary methods include in monitoring the concrete in Step (C), Part (i), the scheduled pour time (which is represented by $t_p$) is the time the concrete truck arrives at the site.

In further exemplary methods, in monitoring the concrete in Step (C), Part (i), the system processor calculates the scheduled pour time (which is represented by $t_p$) based on location information provided by a global positioning system (GPS) and traffic information, historical deliveries to the same job site, information received from contractors placing concrete at the jobsite or a combination thereof.

In still further exemplary methods, in monitoring the concrete in Step (C), Part (i), the system processor calculates the scheduled pour time (which is represented by $t_p$) based on information provided by contractors through a mobile device.

The monitoring systems used in the invention may be based on the use of hydraulic pressure, strain gauges, or mixture of both, for predicting the slump or other rheology measurement of the concrete. Hence in further exemplary methods of the invention, the system processor calculates the current slump characteristic (which is designated by $S_C$) based on signals provided by at least one hydraulic sensor, at least one force sensor, or combination thereof.

In still further exemplary methods, in monitoring the concrete in Step (C), Part (iii), the system processor calculates the dosage required to achieve the slump characteristic increase $\Delta S$ (which is designated by $D_{\Delta S}$) based on the current rate of slump characteristic loss.

In further exemplary methods, in monitoring the concrete in Step (C), Part (iii), the system processor calculates the dosage required to achieve the slump increase $\Delta S$ (which is designated by $D\Delta S$) based on the variability of the data within the datasets provided in Step (B).

In other exemplary methods, in monitoring the concrete in Step (C), the system processor calculates the time required to add the chemical admixture based on the time required to pump the admixture, the time required to mix chemical throughout the volume of concrete, other code requirements in accordance with ASTM C94-16a or combinations thereof.

The present invention also provides a system for dosing a liquid plasticizer chemical admixture into a concrete load contained in a delivery mixer truck. An exemplary system comprises: a processor unit, at least two sensors in communication with the processor unit to enable monitoring of the slump of concrete load contained in a delivery mixer truck mixer drum and to enable monitoring of at least one rotational property of the mixer drum, and a liquid dispenser control in communication with the processor unit for introducing a liquid plasticizer chemical admixture into a concrete load contained in a delivery mixer truck, the processor unit being programmed to perform the above exemplary methods described above.

While the invention is described herein using a limited number of embodiments, these specific embodiments are not intended to limit the scope of the invention as otherwise described and claimed herein. Modifications and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage dry weight unless otherwise specified.

Example 1

What follows is an example that illustrates the unexpected advantages and of delaying the majority percentage addition of chemical admixture during transit delivery. Sixteen loads of concrete, based on the same concrete mix design, were batched and delivered in the same concrete mixer truck outfitted with an automated slump management system (Verifi LLC of Cambridge, Mass. USA). All concrete loads were initially adjusted to a slump of 2 inches (±1) without the use of a cement dispersant chemical admixture. At this point, a first sample was taken to determine strength before addition of admixture and ensure a consistent water content was achieved. The mixing speed of the mixer drum was set at three (3) revolutions per minute (rpm) for sixty (60) minutes.

Protocol 1 was used on ten loads wherein the concrete was dosed with chemical admixture to achieve eight inch slump immediately after the initial slump was confirmed with the automated slump management system. The slump was maintained at eight inches, and if the slump fell by half an inch, then admixture was added automatically by the slump management system in the amount necessary to return slump to eight inches. After sixty minutes from the time the concrete achieved the initial slump, the concrete was mixed at 18 rpm for one minute and then discharged for testing. Testing included duplicate slump measurements, air content, unit weight and strength. The total dosage of chemical admixture added into the concrete was recorded.

Six loads were dosed according to a Protocol 2. In this protocol the loads were dosed to achieve slump of four inches immediately after the initial slump was confirmed. The slump was maintained at 4 inches with the same half-inch (½") tolerance. After fifty minutes, some admixture amount was added so that the total dose administered by both protocols were equal. If Protocol 2 was more efficient in terms of dosage, at equal dose, the slump for Protocol 2 should be higher than Protocol 1. The concrete was mixed at 18 rpm for one minute then discharged and tested in the same manner as occurred for protocol 1.

Because of the inherent variability in the materials and test methods (i.e. each load of concrete will have a variable amount of different materials due to the tolerances of the batching equipment, and each physical testing method has its own associated errors), the data was normalized as a dose response (dose required per unit slump increase) was compared between each protocol. This was calculated as the total dose divided by the measured slump after sixty minutes. A typical Analysis of Variance which is sometimes referred to as ANOVA (See e.g. Statistical Methods for Research Workers (ISBN 0-05-002170-2)) was used on the two sets to determine that the means of the sets were statistically different with a significance of 1%. For Protocol 1, the mean dose response was 6.3±0.2 ounces/inch (i.e., the weight amount of admixture necessary to achieve slump gain of one inch), while in Protocol 2 the mean dose response was 5.4±0.1 ounces/inch, thus reflecting a reduction of fourteen percent (14%) in the amount of admixture required to achieve the same level of slump performance. The plus/minus values represent the variance around the mean value.

For each of the ten loads using Protocol 1 and the six loads using Protocol 2, the following calculations were made: (a) cumulative dose ($D_C$) before the last addition; (b) the time of the last addition—the time of batching ($t_c-t_b$); (c) the dose of the last addition ($D_{AS}$); (d) the time of discharge—the time of the last addition ($t_p-t_c$); (e) $D_C/(t_c-t_b)$; and (f) $D_{AS}/(t_d-t_c)$. For all loads using Protocol 1, the ratio in e) was greater than the ratio in f). Conversely, for all the loads using Protocol 2, the ratio in e) was less than the ratio in f). The ratios for all the loads are shown below in Table 1.

TABLE 1

| Protocol | Ratio in e) | Ratio in f) |
| --- | --- | --- |
| 1 | 3.13 | 0.11 |
| 1 | 0.51 | 0.13 |
| 1 | 0.48 | 0.33 |
| 1 | 0.53 | 0.17 |
| 1 | 2.05 | 0.05 |
| 1 | 2.21 | 0.08 |
| 1 | 10.27 | −0.58 |
| 1 | 15.40 | −0.56 |
| 1 | 2.58 | 0.06 |
| 1 | 9.00 | −1.13 |
| 2 | 0.08 | 3.18 |
| 2 | 0.20 | 1.69 |
| 2 | 0.41 | 1.21 |
| 2 | 0.37 | 1.10 |
| 2 | 0.44 | 1.05 |
| 2 | 0.28 | 4.06 |

Example 2

In addition to the dose response, a comparison between the strengths before admixture addition and at the end of each protocol was analyzed. Any changes in strength would be due to the different mixing protocol as water and air contents were nominally equal. The increase in strength as a percentage of the initial strength of the concrete (before addition of the chemical admixture) was calculated as follows: (Final strength−initial strength)/initial strength.

For Protocol 1, an average increase of 0.6±0.1% was observed, while, for Protocol 2, an average increase of 5.2±0.1% was observed. An ANOVA shows that the means of the sets were statistically different at a significance of 5%. The plus/minus values represent the variance around the mean value.

Example 3

A further test was done regarding 28 strength properties of the concretes, as tested on the concrete mix before addition of the chemical admixture, to obtain additional confirmation that the water contents were similar for all mixes. The results from ANOVA showed no statistically significant different between the means of the two datasets.

Example 4

The present inventors surmise that a hypothetical example could be used to validate the surprising advantages and benefits of the present invention. Consider a concrete delivery truck is leaving the batch plant on its way to a jobsite with a fresh load. The previous ten deliveries using the same mixer truck type and concrete mix design have yielded data, as obtained through the automated slump monitoring system, of an average ounce/inch slump response of four inches slump increase for each ounce of polymer cement dispersant chemical admixture (within a margin of +/−one half inch). The time required to administer and mix in has been ten minutes, plus or minus one minute. Using GPS (global positioning system) data, the time to jobsite arrival is predicted to be 44 minutes. Past deliveries have taken an average of 46 minutes±5 minutes. The current slump for the current delivery is at three inches (3"). Based on this information, the slump monitoring system will continue to maintain the slump at 3" until the concrete mixer is 30 minutes from the jobsite (at which time, it will take 10 minutes to administer and mix in the chemical admixture, with five minutes to spare). This can be updated every minute, for example, to include further recent historical deliveries and changes in traffic or jobsite delays.

The present invention is described herein using a limited number of illustrative embodiments not intended to limit the scope of the invention as otherwise described and claimed herein.

What is claimed is:

1. A method for dosing a cement plasticizer chemical admixture into a concrete load contained in a delivery mixer truck using a processor-controlled system and a delivery mixer truck mixer drum, comprising:
   (A) providing a concrete mix load into the rotatable drum of a delivery truck, the concrete mix load having a known volume;
   (B) providing a processor-accessible database having data sets obtained from at least four doses of a cement plasticizer chemical admixture, wherein the data sets comprise a slump characteristic of the concrete mix load before the addition of the cement plasticizer chemical admixture to the concrete mix load, a slump characteristic of the concrete mix load after the addition of the cement plasticizer chemical admixture, the volume of the cement plasticizer chemical admixture added to achieve the change in slump characteristic, and the volume of concrete mix load to which the cement plasticizer chemical admixture was added;
   (C) monitoring the concrete mix load in the truck drum during transit at least every five minutes from at least batching until dosing of the cement plasticizer chemical admixture using a processor unit to calculate the time-to-administer the cement plasticizer chemical admixture dose (which is designated by $t_a$) for the concrete mix load based upon
      i. a scheduled pour time (which is designated by $t_p$);
      ii. the slump characteristic increase (which is designated by $\Delta S$) required to achieve the target slump characteristic at pouring wherein the slump characteristic increase is calculated using the relationship $\Delta S = S_T - S_c$ wherein $S_T$ represents target slump characteristic and $S_c$ represents current slump characteristic of the concrete mix load during transit;
      iii. the dosage of the cement plasticizer chemical admixture required to achieve the slump characteristic increase $\Delta S$ (which is designated by $D_{\Delta S}$) which is based on the current slump characteristic (which is designated by $S_C$), and the data described above in Step (B);
   wherein the time-to-administer the cement plasticizer chemical admixture dose (which is designated by $t_a$) is calculated by the relationship $t_a = t_p - t_h$, where $t_h$ is based on at least the time required to add the cement plasticizer chemical admixture; and
   (D) administer the cement plasticizer chemical admixture dose when the current time ($t_c$) equals or exceeds the time-to-administer ($t_c \geq t_a$) such that the following relationship is satisfied:

$$D_{\Delta S} > D_c/(t_c - t_b) \times (t_p - t_a)$$

wherein $t_c$ represents the current time, $t_a$ represents the time-to-administer the cement plasticizer chemical admixture dose, $D_{\Delta S}$ represents the dosage required to achieve a target slump characteristic from a current slump characteristic, $D_c$ represents the total cumulative cement plasticizer chemical admixture dosages since time of batching ($t_b$) up to current time ($t_c$), and $t_p$ represents the time at which the concrete load is scheduled to be poured.

2. The method of claim 1 wherein, in Step (B), the slump characteristic is slump or slump flow.

3. The method of claim 1 wherein, in Step (B), the processor-accessible database having data sets is obtained from at least ten doses of the cement plasticizer chemical admixture.

4. The method of claim 1 wherein, in Step (B), the processor-accessible database having data sets is obtained from at least fifty doses of the cement plasticizer chemical admixture.

5. The method of claim 1 wherein, in Step (B), the processor-accessible database having data sets further includes information about the mix design of the concrete to which the addition of cement plasticizer chemical admixture was made, information about the mixer drum to which the addition of cement plasticizer chemical admixture was made, information about the mixer drive system which was used to rotate the mixer drum to which the addition of cement plasticizer chemical admixture was made, information about the concrete to which the addition of cement plasticizer chemical admixture was made, or combinations thereof.

6. The method of claim 1 wherein, in Step (C), the concrete mix load in the truck drum is monitored at least every 1 minute.

7. The method of claim 1 wherein, in Step (C), the concrete mix load in the truck drum is monitored from at least batching to discharging of the concrete.

8. The method of claim 1 wherein, in Part (i) of Step (C), the scheduled pour time (which is represented by $t_p$) is the time the concrete truck arrives at a job site.

9. The method of claim 1 wherein, in Part (i) of Step (C), the processor unit calculates the scheduled pour time (which is represented by $t_p$) based on location information provided by a global positioning system (GPS) and traffic information, historical deliveries to the same job site, information received from contractors placing concrete at the job site, or a combination thereof.

10. The method of claim 9 wherein the processor unit calculates the scheduled pour time (which is represented by $t_p$) based on information provided by contractors through a mobile device.

11. The method of claim 1 wherein, in Part (ii) of Step (C), the processor unit calculates the current slump characteristic (which is designated by $S_C$) based on signals provided by at least one hydraulic sensor, at least one force sensor, or combination thereof.

12. The method of claim 1 wherein, in Part (iii) of Step (C), the processor unit calculates the dosage required to achieve the slump characteristic increase $\Delta S$ (which is designated by DAs) based on the current rate of slump characteristic loss.

13. The method of claim 1 wherein, in Part (iii) of Step (C), the processor unit calculates the dosage required to achieve the slump characteristic increase $\Delta S$ (which is designated by $D_{\Delta S}$) based on the variability of the data within the datasets provided in Step (B).

14. The method of claim 1 wherein, in Step (C), the processor unit calculates the time required to add the cement plasticizer chemical admixture based on the time required to pump the cement plasticizer chemical admixture, the time required to mix the cement plasticizer chemical admixture throughout the volume of concrete, other code requirements in accordance with ASTM C94-16a, or combinations thereof.

* * * * *